United States Patent
Frederiksen et al.

(10) Patent No.: US 11,255,953 B2
(45) Date of Patent: Feb. 22, 2022

(54) OPTICAL ELEMENT FOR A LIDAR SYSTEM

(71) Applicant: Robert Bosch GmbH, Stuttgart (DE)

(72) Inventors: Annette Frederiksen, Renningen (DE); Stefanie Hartmann, Rottenburg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 349 days.

(21) Appl. No.: 16/337,017

(22) PCT Filed: Oct. 4, 2017

(86) PCT No.: PCT/EP2017/075101
§ 371 (c)(1),
(2) Date: Mar. 27, 2019

(87) PCT Pub. No.: WO2018/072993
PCT Pub. Date: Apr. 26, 2018

(65) Prior Publication Data
US 2019/0219676 A1  Jul. 18, 2019

(30) Foreign Application Priority Data

Oct. 17, 2016 (DE) .................. 102016220232.4

(51) Int. Cl.
*G01S 7/481* (2006.01)
*G02B 5/32* (2006.01)
*G03H 1/04* (2006.01)

(52) U.S. Cl.
CPC .......... *G01S 7/4817* (2013.01); *G01S 7/4812* (2013.01); *G01S 7/4814* (2013.01); *G01S 7/4818* (2013.01);
(Continued)

(58) Field of Classification Search
CPC .... G01S 7/4817; G01S 7/4814; G01S 7/4818; G01S 7/4812; G02B 5/32; G03H 2001/0439
See application file for complete search history.

(56) References Cited

U.S. PATENT DOCUMENTS 5,654,831 A * 8/1997 Byren ................ G02B 19/0014
359/718
6,584,052 B1 * 6/2003 Phillips .................... G02B 7/04
369/53.1
(Continued)

FOREIGN PATENT DOCUMENTS

DE  102013210887 A1  12/2014
DE  102013221506 A1  4/2015
DE  102014212186 A1  12/2015

OTHER PUBLICATIONS

International Search Report for PCT/EP2017/075101, dated Dec. 20, 2017.
(Continued)

*Primary Examiner* — Jade R Chwasz
(74) *Attorney, Agent, or Firm* — Norton Rose Fulbright US LLP; Gerard Messina

(57) ABSTRACT

An optical element for a lidar system. The optical element includes an expanding optical system configured to expand received light beams, and a projection lens configured to receive and parallelize each of the expanded light beams from the expanding optical system. The expanding optical system and/or the projection lens is formed as a holographic optical element.

13 Claims, 6 Drawing Sheets

(52) U.S. Cl.
CPC ....... *G02B 5/32* (2013.01); *G03H 2001/0439* (2013.01)

(56) References Cited

U.S. PATENT DOCUMENTS

| | | |
|---|---|---|
| 10,145,533 B2* | 12/2018 | Popovich ................. G02B 5/32 |
| 2006/0065835 A1 | 3/2006 | Redmer |
| 2013/0208256 A1 | 8/2013 | Mamidipudi et al. |
| 2015/0234195 A1* | 8/2015 | Honea ................ G02B 19/0023 359/618 |

OTHER PUBLICATIONS

IEC 60825-1, "Safety of Laser Products", ICE:1993+A1:1997+A2:2001 (E), Edition 1.2, 2001, pp. 1-22.

\* cited by examiner

OPTICAL ELEMENT FOR A LIDAR SYSTEM

FIELD OF THE INVENTION

The present invention relates to an optical element for a lidar system. The present invention also relates to a method for producing an optical element for a lidar system.

BACKGROUND INFORMATION

In the existing art, there are lidar sensors, for example in the automotive field in the form of so-called TOF (time of flight) sensors that conduct transmitted light to the surrounding environment via a deflecting mirror or a transmission optical system, and acquire reflected radiation. There are various technical configurations of such lidar sensors. On the one hand, so-called macroscanners are used, in which a, for example, rotating macromirror has a diameter in the centimeter range. In this way, in the transmission path a beam having a diameter in the centimeter range can be guided via the rotating macromirror. The large beam diameter has advantages with regard to maintaining eye safety, because the diameter of a human pupil, assumed to be 7 mm in relevant norms (IEC 60825-1), can take in only a fraction of the beam. Moreover, a larger beam diameter is more robust against interference such as rain or dust.

An alternative system configuration is the use of so-called microscanners. These are small mirrors having a diameter in the millimeter range, typically about 1 mm to about 3 mm, manufactured in MEMS technology, and that can pivot in one or two geometrical axes in order to realize a beam deflection. These microscanners are advantageous due to their small size and the absence of macroscopically moved elements. However, the small mirror diameter can have disadvantageous effects with regard to eye safety and robustness.

In addition, it is possible only with difficulty to make these micro mirror-based systems coaxial, i.e. having an identical optical path for the transmit and receive path, because the micromirror limits the receive aperture too greatly, and as a result not enough photons can be collected.

SUMMARY OF THE INVENTION

An object of the present invention is to provide an improved optical element for a lidar system.

According to a first aspect, the present invention provides an optical element for a lidar system, having:
an expanding optical system and
a projection lens,
the expanding optical system and/or the projection lens being formed by a holographic optical element.

According to a second aspect, the object is achieved by a method for producing an optical element for a lidar system, having the steps:
providing an expanding optical system; and
providing a projection lens;
the expanding optical system and/or the projection lens being formed by a holographic optical element.

In this way, a compact optical element is advantageously provided for a lidar system that can be used for example for a compact lidar sensor in the automotive field. Advantageously, in this way constructive space in the motor vehicle can be used for other purposes. In addition, the proposed optical element for scanning lidar systems enables larger angles of deflection to be realized.

Specific embodiments of the optical element for a lidar system are the subject matter of the descriptions herein.

An advantageous development of the optical element is distinguished in that the holographic element of the expanding optical system and/or the holographic element of the projection lens are configured so that an f-number of the projection lens is smaller than one. In this way, as a result a compact optical system can advantageously be realized for a lidar system.

A further advantageous development of the optical element provides that the holographic optical element is made with one optical function per layer. Through such a so-called non-multiplexed hologram, the beams directed by the scanning laser impinge on the hologram at different angles of incidence, and each pixel of the hologram has to realize only one defined direction. As a result, in this way a simplified optical function is provided by the hologram with which the hologram bundles the impinging laser light.

A further advantageous development of the optical element is characterized in that the holographic optical elements of the expanding optical system and of the projection lens are configured such that a distance between the expanding optical system and the projection lens is minimized. In this way as well, a compact lidar system can be realized.

A further advantageous development of the optical element provides that the holographic optical element is made having a defined number of a plurality of optical functions per layer. By such so-called multiplex holograms, in which a plurality of optical functions are written to one volume, as a result a shorter distance can be achieved between the expanding optical system and the projection lens. In this case, light can be distributed in a plurality of directions from a pixel of the expanding optical system.

A further advantageous development of the optical element is characterized in that the holographic materials are polymer-based materials. In this way, demands on the holograms can advantageously be met when the motor vehicle is in environments that are characterized in particular by high temperature fluctuations, for example in a range between about −40° C. and about 120° C.

A further advantageous development of the optical element is distinguished in that the holographic optical elements of the expanding optical system and of the projection lens are realized as holographic films. In this way, the holographic elements can advantageously be efficiently produced using known production methods and are suitable for further processing.

A further advantageous development of the optical element is distinguished in that the holographic films are laminated onto surfaces of a carrier material that are situated opposite one another. In this way, a particularly compact realization of the optical element can be provided.

In the following, the present invention, with further features and advantages, is described in detail on the basis of a plurality of Figures. Identical or functionally identical elements have the same reference characters. The Figures are intended in particular to illustrate the essential principles of the present invention and are not necessarily true to scale. For clarity, not all reference characters may be shown in all the Figures.

Disclosed device features result analogously from corresponding disclosed method features, and vice versa. This means in particular that features, technical advantages, and embodiments relating to the optical element for a lidar system result analogously from corresponding embodiments, features, and advantages of the method for producing an optical element for a lidar system, and vice versa.

DETAILED DESCRIPTION

An important aspect of the present invention is to provide at least one holographic optical system for a coaxial lidar system in which a common optical path is provided for the transmit and receive path. In this way, limitations of conventional optical systems can be overcome, and the constructive space of the overall system can be reduced, or angles of deflection of the scanning laser beams can be increased.

For this purpose, holographic materials based on polymer materials may be used that act as diffraction gratings in the infrared spectral range. The named polymer materials have advantageous properties for use in the automotive field, because they are very resistant to the environmental influences that prevail there (e.g. fluctuations of temperature or of humidity, etc.).

Figure 1:
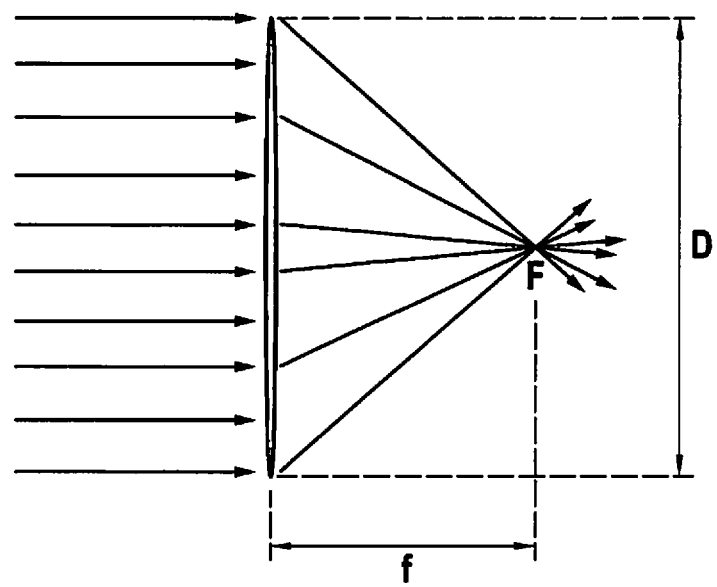
FIG. 1 shows a schematic representation of the functioning of an optical lens.

FIG. 1 shows the configuration of a conventional optical system having a lens having a diameter D, a focal length f, and a focal point F. Here the following mathematical equation or condition holds for a lens that is to be produced at a reasonable expense:

$$f/D > 1 \quad (1)$$

Lenses having an f-number<1 can also be realized, at great expense.

Generally, the f-number of an optical system is understood as the ratio between the focal length f and the diameter D of the effective pupil of entry of the optical system.

Differing from this, in holographic optical systems there exist no limitations of the optical system with regard to the f-number and/or the refractive power. This is because the focal length f of a holographic lens or of a holographic hollow mirror and the diameter of the hologram are defined exclusively by the position of point light sources and by an illuminated region in the receiving area of the holographic lens.

Figure 2:
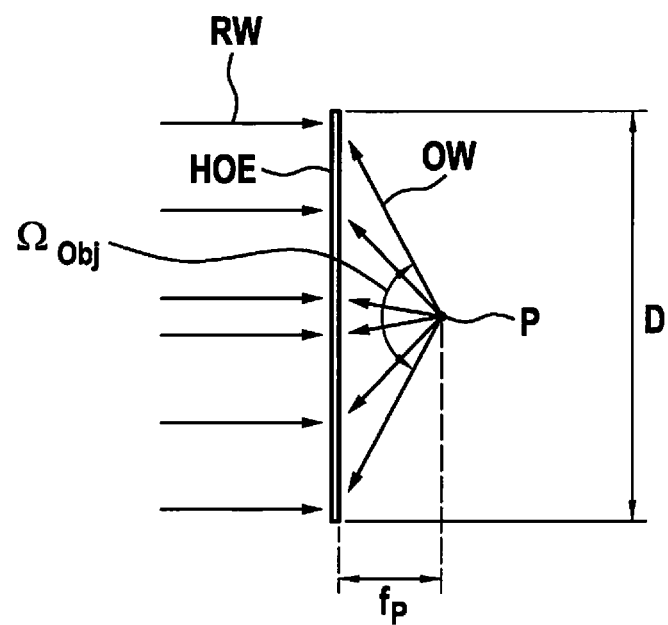
FIG. 2 shows a schematic representation of a receiving configuration of a holographic hollow mirror having a flat reference shaft and a divergent object shaft, from a point.

FIG. 2 shows a receiving configuration for a holographic hollow mirror. Shown is the special case of a flat reference shaft RW and a divergent object shaft OW from an object point P brought into interference at the level of the holographic optical element HOE. The diameter D and the focal length $f_p$ of the holographic optical element HOE result from the distance of the object point P and the opening angle $\Omega_{obj}$ of the object shaft. The two parameters are independent of one another, and as a result the limitation of classical optical systems described in Equation (1) can be circumvented. Holographic optical systems shape light on the basis of diffraction, whereas conventional lenses shape light on the basis of refraction.

Figure 3:
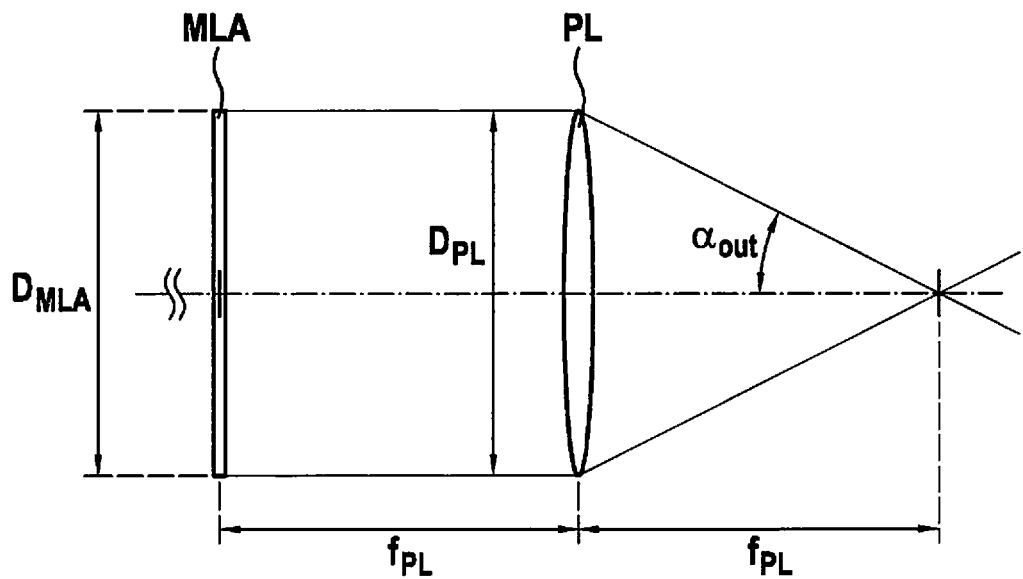
FIG. 3 shows a schematic representation of a part of a beam path of an optical system.

FIG. 3 schematically shows a part of a beam path of an optical system having a microlens array MLA and a projection lens PL. Here the simplifying assumption is made that the beam from the microlens array impinges perpendicularly on projection lens PL, which is not the case in reality if the microlens array has a beam-expanding function.

It can be shown that the half optical output angle $\alpha_{out}$ is subject to the following mathematical relationship:

$$\alpha_{out} = \arctan\left(\frac{D_{MLA}}{2 \cdot fPL}\right)$$

where:
$D_{PL}$: diameter of the projection lens
$D_{MLA}$: diameter of the microlens array
$f_{PL}$: focal length of the projection lens If in addition it is assumed that the f-number $k_2$ of the projection lens PL can be a minimum of one, it follows that the diameter $D_{MLA}$ of the microlens array is equal to the focal length $f_{PL}$ of the projection lens PL. It follows from this in turn that the maximum ideal angle of deflection can be 26.57°, the real value being smaller because here idealized assumptions were made.

Figure 4:
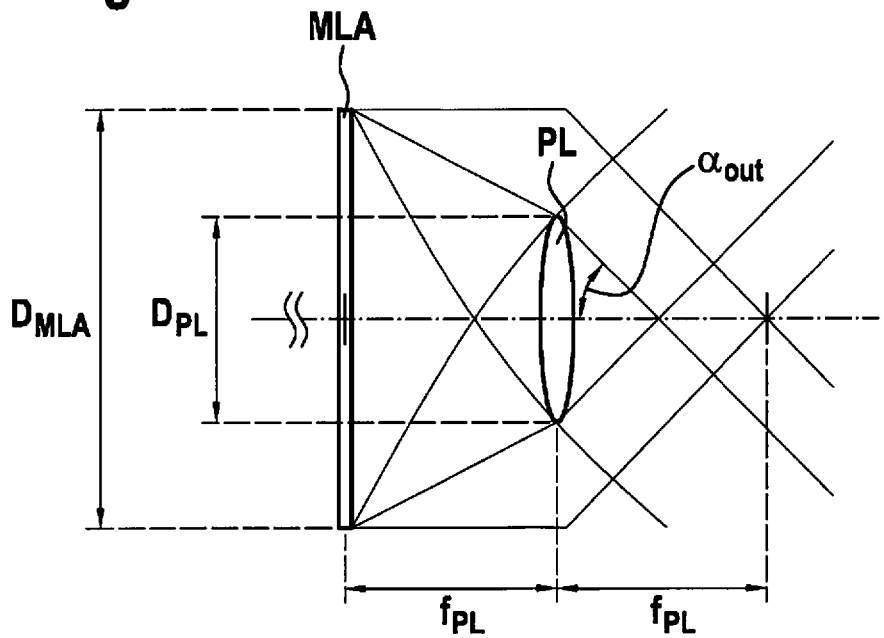
FIG. 4 shows a schematic representation of a part of a beam path of a further optical system.

In order to achieve a larger angle of deflection, as shown in FIG. 4, the following must hold:

$$D_{PL} < D_{MLA}$$

For this purpose, as can be seen in FIG. 4, the projection lens PL has to be significantly smaller, which however cannot be realized in practice because the focal length of a lens cannot be smaller than its diameter. In addition, the microlens array MLA (location-dependent deflection and expansion) shown in FIG. 4 also cannot be realized by a conventional microlens array.

At the transmission side, an expanded laser beam is particularly advantageous because in this way more power can be transmitted by the laser. This is due to the fact that a diameter of a pupil of the human eye is assumed to be 7 mm, and in the case of a larger beam only part of the power can be taken in by the eye (this is a simplified description; more precise calculation rules using three pulse criteria can be found in the laser protection norm IEC 60825-1). If this configuration is also used at the receive side, a large aperture for the collection of as many photons as possible is always advantageous.

In classical optical systems, with regard to the constructive space there are limitations that can be expressed by the following mathematical equations:

$$f_2 = k_2 \cdot D$$

$$d_{Sp-PL-N\"aherung} = f_2 + d_{Sp-MLA}$$

-continued $$D_{MLA} = (D - d_{Strahl2}) \cdot \frac{d_{SP-MLA}}{d_{Sp-PL-Näherung}}$$

$$D_{MLA-Linse} = \frac{D_{MLA}}{anz\_px}$$

$$d_{Strahl1} = D_{MLA-Linse}$$

$$\alpha_{MLA} = \arctan\left(\frac{d_{Strahl2}}{2 \cdot f_2}\right)$$

$$f_1 = \frac{-d_{Strahl1}}{2 \cdot \tan(\alpha_{MLA})}$$

$$d_{MLA-PL} = f_2 + f_1$$

$$d_{Sp-PL} = |-f_2 - f_1 - d_{Sp-MLA}|$$

$$\alpha_{Sp} = \arctan\left(\frac{D/2 - d_{Strahl2}/2}{d_{Sp-PL}}\right)$$

$$D_{MLA} = 2 \cdot d_{Sp-MLA} \cdot \tan(\alpha_{Sp})$$

$$\alpha_{MLA-oben} = \arctan\left(\frac{\frac{d_{Strahl1}/2}{\cos(\alpha_{Sp})} - f_1 \cdot \tan(\alpha_{Sp})}{-f_1}\right)$$

$$\alpha_{MLA-unten} = -\arctan\left(\frac{\frac{d_{Strahl1}/2}{\cos(\alpha_{Sp})} + f_1 \cdot \tan(\alpha_{Sp})}{-f_1}\right)$$

$$\alpha_{out} = \arctan\left(\frac{(d_{Sp-MLA} + f_1) \cdot \tan(\alpha_{Sp})}{f_2}\right)$$

$$bb = D$$

$$bl = d_{Sp-PL}$$

Figure 5:
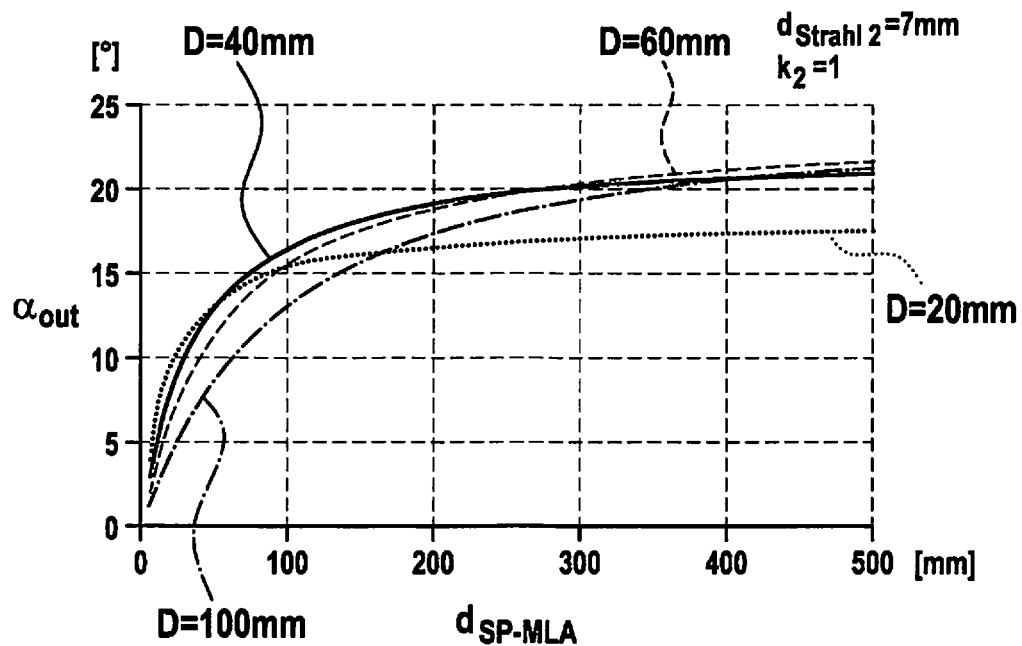
FIG. 5 shows an example of a curve of a maximum achievable optical angle of deflection of a beam as a function of various parameters of an optical element.

[Näherung: approximation
Strahl: beam
Linse: lens
oben: top
unten: bottom]
with the parameters:
D: diameter of the projection lens PL
$k_2$: f-number of the projection lens PL
$f_2$: minimum focal length of the projection lens PL
$d_{SP-MLA}$: distance between the micromirror SP and the microlens array MLA
$d_{Beam,2}$: diameter of the beam at the projection lens PL
$d_{SP-PL}$: distance between micromirror SP and microlens array MLA
$D_{MLA}$: size of the microlens array MLA
anz_px: number of pixels of the microlens array MLA
$D_{MLA-Lens}$: diameter of a lens of the microlens array MLA
$d_{Beam,1}$: diameter of the beam at the microlens array MLA
$\alpha_{MLA}$: half angle behind the microlens array MLA
$f_1$: focal length of the lenses of the microlens array MLA
$d_{MLA-PL}$: distance between the microlens array MLA and the projection lens PL
$\alpha_{Sp}$: maximum half optical angle after the micromirror SP
$\alpha_{MLA-top}$: angle after the microlens MLA at top for the upper beam
$\alpha_{MLA-bottom}$: angle after the microlens MLA at bottom for the lower beam
$\alpha_{out}$: half optical angle behind the projection lens PL FIG. 5 shows examples of curves of achievable angles of deflection $\alpha_{out}$ in conventional optical systems as a function of various parameters given the use of the mathematical equations described above. On the y-axis, the maximum achievable angle of deflection $\alpha_{out}$ is plotted, and on the x-axis the distance $d_{SP-MLA}$ between the micromirror SP of the scanning lidar system and an expanding optical system MLA in the form of a microlens array is plotted.

It can be seen that in this way, given usable angles of deflection $\alpha_{out}$, only relatively large distances can be realized between micromirror SP and expanding optical system MLA.

It is proposed that the expanding optical system MLA and/or the projection lens PL be realized holographically. Differing from conventional optical systems, in holographic optical elements, as volume holograms, the beam deflection is not specified by refraction but rather by diffraction at the volume grating. This offers the advantageous possibility of producing optical elements having an f-number<1. The named holographic optical elements HOE can thus be made both in transmission and in reflection, and enable new constructive shapes through a free selection of angles of incidence and emergence, or of diffraction. The holographic diffraction grating required for this is illuminated in a thin film.

This can be applied to an example of a conventional coaxial optical system for a lidar system. Known systems are greatly limited by the relationships defined in Equation (1). An expanding optical system MLA, in the form of a microlens array, is made up of many small individual mirrors that expand the scanning beam of a laser and guide it to a projection lens PL.

Through the use of at least one holographic lens, a new approach is proposed relating to a use of an optical element for a scanning lidar system. In addition, the characteristic decoupling of the angle of incidence and the angle of emergence in holograms enables new configuration approaches. In this way, using a holographic lens the distance between the expanding optical system MLA and the projection lens PL is no longer limited by the condition described in Equation (1).

Figure 6:
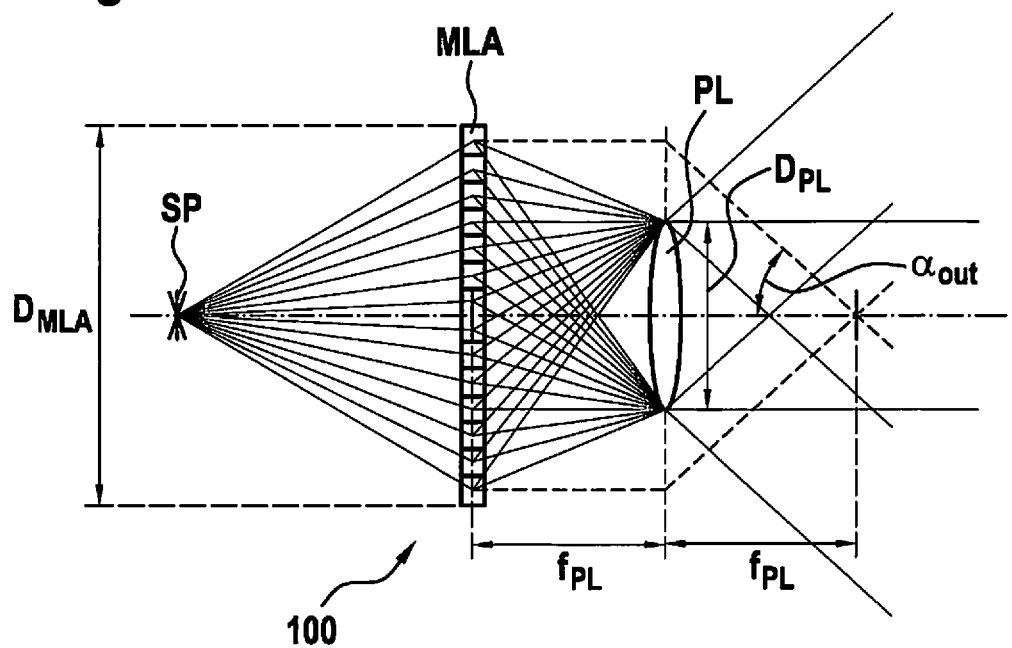
FIG. 6 shows a schematic representation of the optical system of FIG. 4 having a holographic element.

FIG. 6 shows a configuration and functioning of a specific embodiment of a proposed optical element 100. The laser beam is deflected by a micromirror SP that pivots in one axis or in two axes, whereby the laser beams impinge on a holographically made expanding optical system MLA in the form of a microlens array. Here, a beam diameter and a distance between micromirror SP and expanding optical system MLA are selected such that the individual beams are separated at the holographic expanding optical system MLA. In this way, it can be ensured that each individual pixel of the holographic expanding optical system MLA only has to process a single beam direction.

The beam impinging on the hologram of the expanding optical system MLA is diffracted, deflected, and expanded, the deflection being dependent on the location. Beams that impinge on the hologram in the middle do not have to be deflected. Laser beams impinging on the hologram at the upper and lower edge must in contrast be maximally deflected so that they also still illuminate projection lens $P_L$. The illumination of only a partial area of projection lens PL is also conceivable, and can be realized in another specific embodiment, not shown in the Figures, of optical element 100.

As a result, the holographic optical elements HOE of the expanding optical system MLA and/or of the projection lens PL are configured such that a diameter $D_{PL}$ of the projection lens PL is minimized, and an overall field of view can be scanned by the named elements.

In FIG. 6, projection lens PL is shown in simplified fashion as a single lens, but it can also be a complex objective having a plurality of lenses.

Through the free selection of the angles of incidence and emergence in holograms, new off-axis configuration approaches are enabled for optical elements in which beams impinge on expanding optical system MLA at different angles from micromirror SP.

Holographic optical element HOE can be produced by an analogous receiving area of a conventional optical system, but can also be written pixel by pixel by a holographic printer. This has the advantage that a specific optical function can be assigned to each pixel of the holographic optical element HOE.

The advantages resulting from the above-named principles for optical element 100 are for example the following:
- smaller constructive space; in particular, the last lens of the optical element 100, in the form of projection lens PL, only has to be as large as the beam diameter that is used;
- large angles of deflection can be realized;
- higher transmit power levels due to realized eye safety, due to the expanded beam;
- the optical function can be stored in a holographic film, which saves costs and space;
- space-saving configuration due to stacking holographic films;
- the holographic element HOE can be printed pixel-by-pixel;
- each pixel of the holographic material only has to process a single beam direction; i.e., only a single optical function has to be realized per layer of the hologram. This means that no multiplexing is required to produce the hologram, and means a high degree of diffraction efficiency;
- the system can also be used at the receive side.

In order to meet the precisely defined requirements relating to resolution at a particular distance from the lidar system, some limitations hold for the described holograms.

For the distance $d_{MLA\text{-}PL}$ between the expanding optical system MLA and the hologram of the projection lens PL, the following conditions hold:

$$\Omega = 2 * \arctan\left(\frac{d_{Strahl,2}/2}{d_{MLA-PL}}\right) \quad (2)$$

$$\frac{\Omega}{d_{Strahl,2} * D_{MLA}/\text{anz\_px}} > 4° \quad (3)$$

Figure 7:
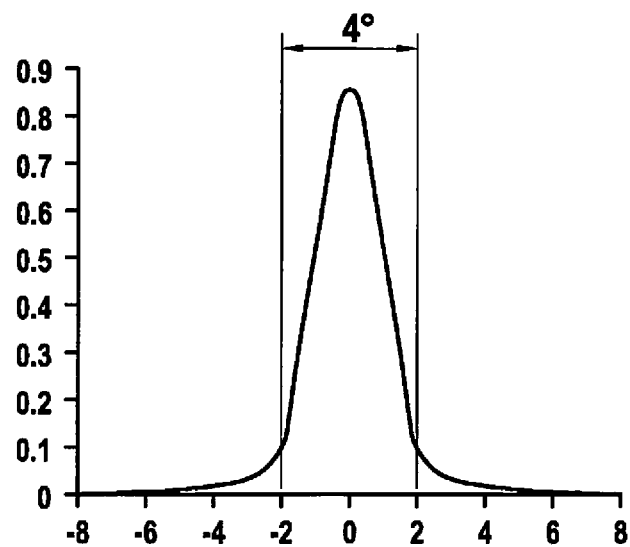
FIGS. 7 and 8 show the functioning of an optical element for a lidar system, realized by two holograms.
Figure 8:
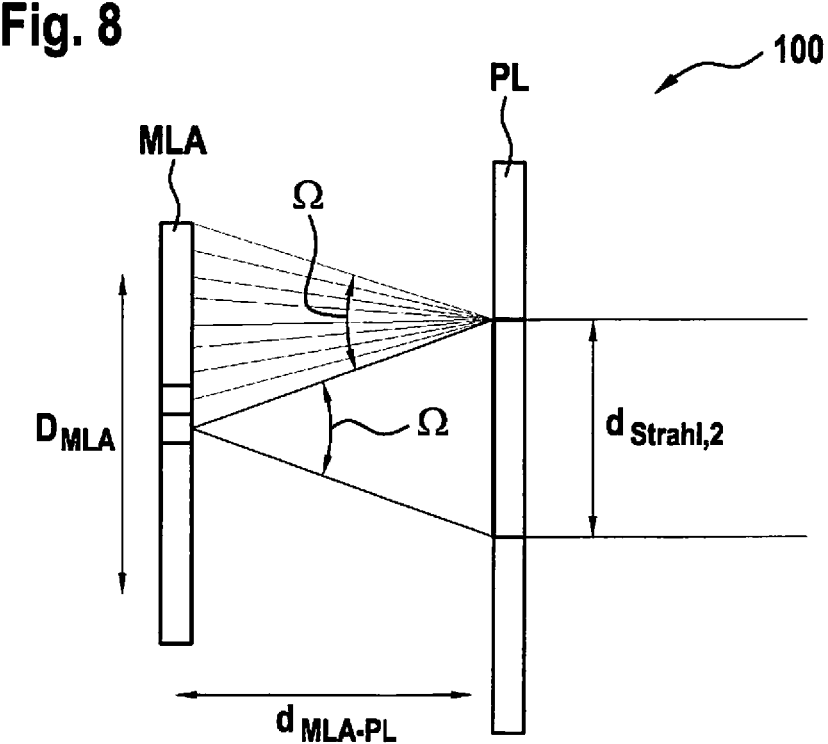

[Strahl: beam]
where:
$\Omega$: spatial angle
anz_px: number of pixels of the microlens array FIGS. 7 and 8 show the functioning of an optical element 100 for a lidar system having a holographic realization of an expanding optical system MLA in the form of a microlens array and a holographic realization of a projection lens PL. Expanding optical system MLA expands the scanning beam, homogenizes it, and guides the homogenized scanning beam to projection lens PL. The holographic element of expanding optical system MLA is printed pixel-by-pixel, a plurality of optical functions being stored per pixel (multiplexed hologram). For example, per pixel an angular selectivity of about 4° can be realized. This is shown in FIG. 7, which shows a curve of a diffraction efficiency via a reconstruction angle.

FIG. 8 indicates that the overall spatial angle $\Omega$ is subdivided into a plurality of segments of which each individual segment is realized by an individual hologram (pixel), each individual hologram having an angular selectivity of four degrees. It can be seen that spatial angle $\Omega$ can be expanded (FIG. 8, top), and as a result spatial angle $\Omega$ can be realized by a plurality of hologram pixels. In addition, it can be seen that spatial angle $\Omega$ can be reflected, and as a result spatial angle $\Omega$ can be realized with each hologram pixel (FIG. 8, bottom).

Thus, in the example of FIG. 7 and FIG. 8, both the expanding optical system MLA and the projection lens PL are realized holographically. A defined region of projection lens PL is assigned to each pixel of the expanding optical system MLA, and all the pixels together illuminate a laser beam over the desired spatial angle $\Omega$. Due to the expansion of the beam by the expanding optical system MLA, the beams deflected by the pixels of expanding optical system MLA overlap at projection lens PL.

For clarity, in FIG. 8 only a single parallelized beam is shown that is deflected by a single hologram pixel of holographic microlens array MLA and forwarded by projection lens PL as the beam $d_{Beam,2}$. Of course it is provided that all the pixels of the holographically realized projection lens PL suitably deflect or forward all the beam directions that can be represented by spatial angle $\Omega$.

Given a beam diameter $d_{Beam,2}$ after projection lens PL of seven mm, a pixel number anz_px of the expanding optical system MLA of 400, and a diameter $D_{MLA}$ of projection lens PL of 200 mm, from Equation (3) there results a distance $d_{MLA\text{-}PL}$ between expanding optical system MLA and projection lens PL of about 29 mm.

Due to the angular selectivity visible in FIG. 7 of the "thick" holograms, there is no interaction of the individual holograms written in a volume. However, the distance between expanding optical system MLA and projection lens PL, and the pixel distance between expanding optical system MLA and the expansion of the scanning beam, must be set such that the angle $\alpha$ shown is greater than four degrees, as defined above in Equation (3).

This is because only in this case is it ensured that no crosstalk occurs between the locally overlapping optical functions of the individual hologram pixels of projection lens PL.

Through multiplexing, a plurality of optical functions can be written to a layer of a holographic material. The number of holograms that can be written to a holographic material is a function of the material, but the efficiency of the individual holograms decreases with the increasing number of stored optical functions. For this reason, it can also be provided to store the optical functions in a plurality of holographic layers laminated onto one another. Through the realization of this stack, a higher degree of efficiency can be achieved in comparison with a multiplex hologram in a single layer.

A further specific embodiment of the optical element can thus provide that the two functions (expansion and deflection) realized by the holographic optical element HOE are realized not by a single holographic optical element HOE but by two holographic optical elements HOE laminated onto one another. Because the holographic optical element requires a different function depending on its location, the incorporation can be realized particularly well by a holographic printer that writes the holographic optical element pixel-by-pixel. Here, the minimum pixel size must not be permitted to exceed the beam diameter of the scanning beam.

As a result, the holographic optical elements HOE of the expanding optical system MLA and/or of the projection lens PL are made such that a distance $d_{MLA\text{-}PL}$ between the expanding optical system MLA and the projection lens PL is minimized.

As a result, the holographic optical element of the expanding optical system MLA and/or the holographic optical element of the projection lens PL are made such that a diameter of the projection lens PL is minimized.

As a result, the holographic optical element of the expanding optical system MLA and/or the holographic optical element of the projection lens PL are made such that an f-number $k_2$ of the projection lens PL<1, or a focal length of the projection lens PL is smaller than a diameter of projection lens PL.

As a result, the holographic optical element of the expanding optical system MLA and/or the holographic optical element of the projection lens PL are in addition made such that angles of deflection of beams after microlens array MLA and of beams after projection lens PL are maximized.

Figure 9:
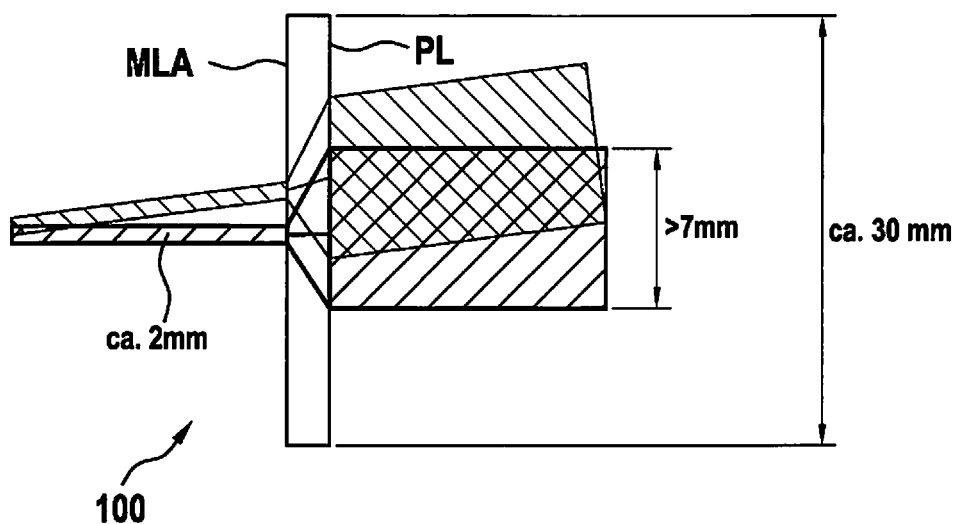
FIG. 9 shows a schematic representation of a functioning of a hologram stack for a lidar system.

FIG. 9 shows such an advantageous specific embodiment of an optical element 100 for a lidar system. In this case, both expanding optical system MLA and projection lens PL are realized holographically, the corresponding holographic optical elements being films that are laminated onto a carrier material (e.g. glass) on both sides. As indicated in FIG. 9, here the two films are each applied or laminated onto a surface of the carrier with a defined thickness.

Visible is a schematic functioning of a hologram stack for the example of a hologram-glass composite about 30 mm in size that has a plurality of optical functions stored in a pixel. It can be seen that an incident scanning beam having a diameter of about 2 mm impinges on a holographic material of the expanding optical system MLA and is expanded by a projection lens PL to a beam diameter of approximately >7 mm. Advantageously, in this way the overall optical functioning of the hologram stack is combined in a single optical element 100.

In this way, through the use of a holographic optical element for a microlens array having additional beam-deflecting functionality can be realized, whereby a particularly compact lidar system can be achieved.

Figure 10:
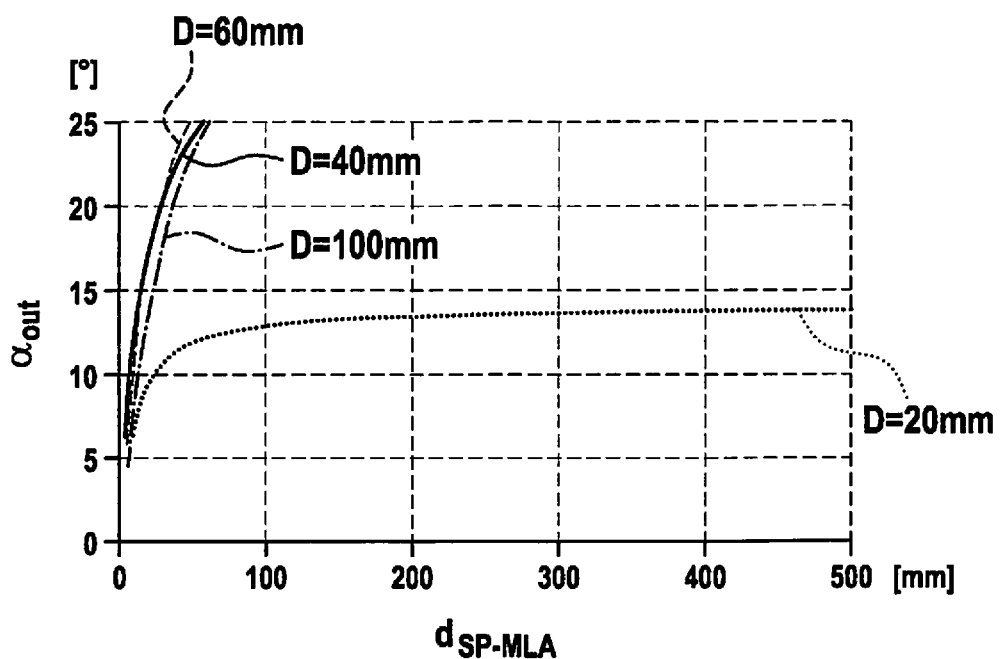
FIG. 10 shows examples of realizable angles of deflection of a holographically realized optical element.

FIG. 10 shows a diagram of realizable angles of deflection $\alpha_{out}$ of a scanning lidar system with an f-number $k_2=0.5$ of projection lens PL, which cannot be realized with a conventional optical system. It will be seen that, compared to the curves of FIG. 5, a significantly smaller constructive space of a lidar system can be realized, which is enabled above all by the significantly reduced or minimized distance between expanding optical system MLA and projection lens PL.

On the x axis the distance between projection lens PL and expanding optical system MLA in millimeters is plotted, and on the y axis the scanning angle $\alpha_{out}$ of the lidar system in degrees is plotted. Four characteristic curves are shown, representing a scan angle curve as a function of different diameters D of projection lens PL. For standard scanning angles of about 15°, it can be seen that a small distance can be realized between micromirror SP and expanding optical system MLA of the lidar system.

Figure 11:
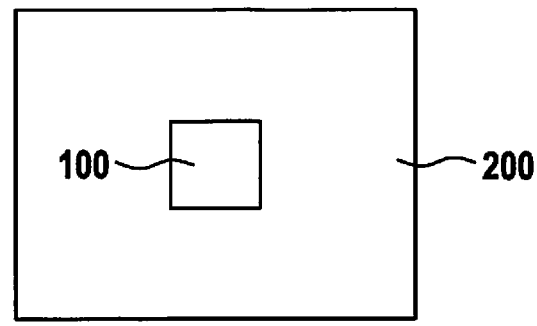
FIG. 11 shows a schematic representation of a lidar system having an optical element.

FIG. 11 shows a schematic diagram of a scanning lidar system 200 with a specific embodiment of proposed optical element 100.

Figure 12:
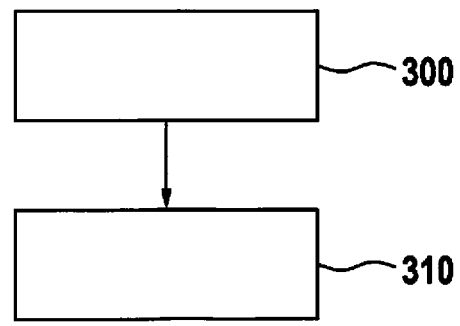
FIG. 12 shows a schematic representation of the sequence of a specific embodiment of a method for producing an optical element for a lidar system.

FIG. 12 shows a schematic sequence of a specific embodiment of the proposed method for producing an optical element 100 for a lidar system.

In a step 300, an expanding optical system MLA is provided.

In a step 310, a projection lens PL is provided, the expanding optical system MLA and/or the projection lens PL being formed by a holographic optical element.

Advantageously, the sequence of steps 300 and 310 is arbitrary.

As a result, in this way an improved transmitting optics is provided for a lidar sensor; of course, it is also possible to use a plurality of transmitting optical systems in combination for the lidar sensor.

Advantageously, the proposed optical element can be used both for micro-based mirror systems and for macro-based mirror systems.

In sum, the present invention provides an improved optical element for a coaxial scanning lidar system. A lidar sensor realized having the proposed optical element can be used in automotive applications for measuring the distance and speed of objects.

The person skilled in the art will recognize that a large number of modifications of the present invention are possible without departing from the core of the present invention.

What is claimed is:

1. A lidar system, comprising:
an optical element, including:
an expanding optical system configured to expand received light beams; and
a projection lens configured to receive and parallelize each of the expanded light beams from the expanding optical system;
wherein the expanding optical system is formed as a holographic optical element, the holographic optical element forming the expanding optical system including a holographic microlens array having a plurality of holographic microlenses, each of the holographic microlenses configured to expand at least one of the received light beams;
wherein the projection lens is also formed as a holographic element;
wherein the holographic element forming the expanding optical system is a first holographic film and the holographic element forming the projection lens is a second holographic film, and the first holographic film being laminated onto a first surface of a carrier material, and the second holographic film being laminated onto a second surface of the carrier material opposite to the first surface.

2. A method for producing an optical element for a lidar system, the method comprising:
providing an expanding optical system configured to expand received light beams; and
providing a projection lens configured to receive and parallelize each of the expanded light beams from the expanding optical system;
wherein the expanding optical system is configured holographically as a holographic element, the holographic element including a holographic microlens array having a plurality of holographic microlenses, each of the holographic microlenses configured to expand at least one of the received light beams;
wherein the projection lens is also formed as a holographic element;
wherein the holographic element forming the expanding optical system is a first holographic film and the holographic element forming the projection lens is a second holographic film, and the first holographic film being laminated onto a first surface of a carrier material, and the second holographic film being laminated onto a second surface of the carrier material opposite to the first surface.

3. The method of claim 2, wherein a holographic optical element of the expanding optical system and/or a holographic optical element of the projection lens is configured such that a dimension of the projection lens orthogonal to the beam path is minimized.

4. The method of claim 2, wherein the holographic optical element includes one optical function per layer.

5. The method of claim 2, wherein the holographic optical elements of the expanding optical system and of the projection lens are configured such that a distance between the expanding optical system and the projection lens is minimized.

6. The method of claim 5, wherein the holographic optical element includes a defined number of a plurality of optical functions per layer.

7. An optical element for a lidar system, comprising:
an optical element, including:
   an expanding optical system configured to expand received light beams; and
   a projection lens configured to receive and parallelize each of the expanded light beams from the expanding optical system;
   wherein the expanding optical system is formed as a holographic optical element, the holographic optical element forming the expanding optical system including a holographic microlens array having a plurality of holographic microlenses, each of the holographic microlenses configured to expand at least one of the received light beams;
   wherein the projection lens is also formed as a holographic element;
   wherein the holographic element forming the expanding optical system is a first holographic film and the holographic element forming the projection lens is a second holographic film, and the first holographic film being laminated onto a first surface of a carrier material, and the second holographic film being laminated onto a second surface of the carrier material opposite to the first surface.

8. The optical element of claim 7, wherein the projection lens is configured such that an f-number of the projection lens is smaller than one.

9. The optical element of claim 8, wherein the holographic optical elements of the expanding optical system and of the projection lens are configured such that a distance between the expanding optical system and the projection lens is minimized.

10. The optical element of claim 9, wherein the holographic optical element includes a defined number of a plurality of optical functions per layer.

11. The optical element of claim 7, wherein the holographic optical element includes one optical function per layer.

12. The optical element of claim 7, wherein the holographic optical element is formed from a polymer-based material.

13. The optical element of claim 7, wherein at least one optical element is in a lidar sensor.

\* \* \* \* \*